Nov. 27, 1923.
J. WEBER
FLYTRAP
Filed March 23, 1921
1,475,357
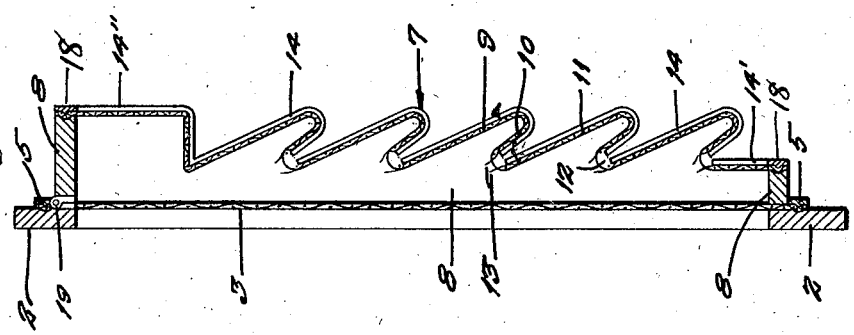
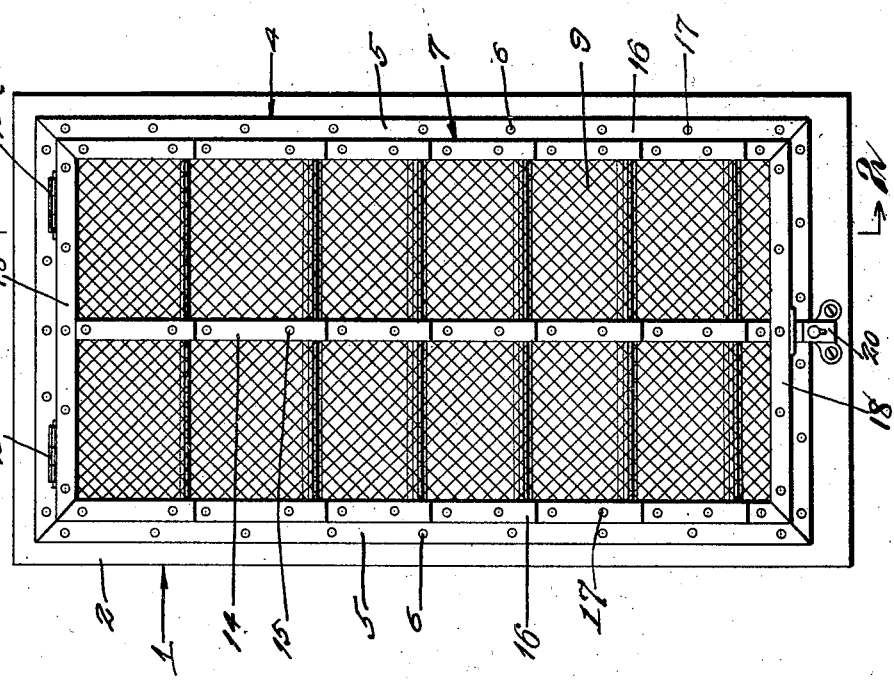
Inventor
Joseph Weber
By Young and Young
Attorneys
Witness
T. P. Britt Patented Nov. 27, 1923.

1,475,357

UNITED STATES PATENT OFFICE.

JOSEPH WEBER, OF LONE ROCK, WISCONSIN.

FLYTRAP.

Application filed March 23, 1921. Serial No. 454,610.

*To all whom it may concern:*

Be it known that I, JOSEPH WEBER, a citizen of the United States, and resident of Lone Rock, in the county of Richland and State of Wisconsin, have invented certain new and useful Improvements in Flytraps; and I do hereby declare that the following is a full, clear, and exact description thereof.

This invention comprehends generally improvements in traps, and more particularly relates to a fly trap for window and door screens, etc.

It is the principal aim and object of the present invention to provide a device of the above-mentioned character designed so as to be attached to the main frame of the screen for the door or window, the device forming in effect a secondary frame and being connected as by hinges, so that after the trapped insects have been exterminated the said frame may be swung open to permit of the discharge of the insects therefrom.

As an equally important object, the invention contemplates the provision of a trap of the character mentioned, wherein the screen carried by the trap frame is corrugated in cross section, forming inclined trapping portions open at their upper ends for the entrance of the flies, and also provided with retaining means in the form of prongs for preventing the escape of the flies.

More specific objects of the invention consist in the improved construction of the trap frame, including the bracing means; the construction of the screen as well as the means for connecting the trap frame to the frame of the screen or the door.

Among the other aims and objects of this invention may be recited the provision of a device of the above character, with a view to compactness, and wherein the number of parts are few, the construction simple, the cost of production low, and the efficiency high.

The invention is clearly illustrated in the accompanying drawings, wherein similar characters of reference are employed in all of the above described views to indicate corresponding parts, and in which:—

Figure 1 is a front elevation of the improved screen, and

Figure 2 is a vertical sectional view on the line 2—2 of Figure 1.

Referring now more particularly to the drawings, there is shown a closure, such as a screen 1, for a window, consisting of a rectangular frame 2 over which is secured a piece of reticulated material, such as wire mesh 3, as by securing means generally designated 4. This securing means includes retaining strips 5 placed over the outer edges of the mesh and held against the adjacent portions of the frame 2 by fasteners 6 which also pass the mesh. Movably connected to the screen 1 is the improved fly trap indicated generally by the numeral 7.

In reducing the invention to practice, the same may be said to consist of a secondary rectangular frame 8 over which is secured a piece of reticulated material 9 in the form of wire screen. This screen is corrugated medially of its length to form inclined trapping portions 10 and 11, which terminate at the upper ends in inlets 12 through which flies or other insects enter, after walking up the screen in their accustomed manner. Prongs 13 formed on the edges of the material about the openings or inlets 12 prevent the escape of the flies after entering the enclosure.

In increasing the rigidity of the screen angular braces 14 formed of strap metal and shaped correspondingly to the outer surface of the screen 9, are secured to the same by suitable fasteners 15. The braces 14 about the trapping portions are substantially U-shaped as shown to advantage in Figure 2, the lower brace 14' being relatively flat, while the upper brace 14" is formed with an angular extension.

In connection with the foregoing it is to be noted that the sides of the frame 8 are corrugated similar to the cross sectional contour of the screen 9, so as to ensure of a snug fit when the screen is secured in position. In accomplishing this latter feature corrugated retaining strips 16 are employed and overlie the side edges of the screen and the corrugated portions of the frame 8 being secured by suitable fasteners 17; also employed to secure the flat strips 18 to the upper and lower edges of the frame 8 over the corresponding edges of the screen 9.

For the purpose of connecting the trap, which may be said to be in the form of a secondary frame, to the main frame 2, suitable hinges 19 serve to establish a pivotal connection between the upper portions of the frames 8 and 2, while the lower end of the frames are releasably held in abutting relation by a catch 20, carried on the main frame 2.

In use, assuming that the parts have been assembled in the manner described and as shown in the accompanying drawings, the flies on alighting on the outer surface of the screen 9 follow their natural tendency of walking upwardly, and in consequence enter through the inlets 12, the enclosure formed between the main and secondary screens and are thereby trapped, since they are prevented from escaping through the inlets 12 by reason of the prongs 13. The flies, of course, may be exterminated, as by gassing or otherwise, and when exterminated, the catch 20 may be actuated so as to permit of the frame 8 being swung open and the contents discharged.

It is believed in view of the foregoing description that a further detailed description of the invention is entirely unnecessary. Likewise it is believed that the advantages of the invention will be readily apparent.

Having thus fully described my invention, what I claim as new, and desire to secure by Letters Patent, is:—

A fly trap including a framed reticulated closure, a secondary frame hinged to said closure and having its walls arranged at right angles to the first said frame, certain of said walls being cut in saw tooth formation to receive on its edges a piece of reticulated material and adapted to cover the entire second frame, inlets formed in said material and at the base of certain corrugations, a receiving chamber at the upper portion of said secondary frame, braces in the reticulated piece for increasing the rigidity thereof, and a catch for releasably holding the secondary frame against the closure.

In testimony that I claim the foregoing I have hereunto set my hand at Lone Rock, in the county of Richland and State of Wisconsin.

JOSEPH WEBER.